United States Patent
Nandy et al.

(10) Patent No.: US 9,305,053 B2
(45) Date of Patent: Apr. 5, 2016

(54) DYNAMIC SESSIONIZATION OF ANALYTICS DATA

(71) Applicants: Sagnik Nandy, Los Gatos, CA (US); Madhu Kallazhi Vasu, Sunnyvale, CA (US); Evan S. Huang, Cupertino, CA (US); Naomi Ben-Ayoun, Santa Clara, CA (US); Lucas Paul Hansen, Seattle, WA (US); Stella Marie Laurenzo, Seattle, WA (US); Jerry Hong, Sunnyvale, CA (US)

(72) Inventors: Sagnik Nandy, Los Gatos, CA (US); Madhu Kallazhi Vasu, Sunnyvale, CA (US); Evan S. Huang, Cupertino, CA (US); Naomi Ben-Ayoun, Santa Clara, CA (US); Lucas Paul Hansen, Seattle, WA (US); Stella Marie Laurenzo, Seattle, WA (US); Jerry Hong, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 13/841,467

(22) Filed: Mar. 15, 2013

(65) Prior Publication Data

US 2013/0297647 A1    Nov. 7, 2013

Related U.S. Application Data

(60) Provisional application No. 61/641,850, filed on May 2, 2012.

(51) Int. Cl.
*G06F 17/30* (2006.01)
*H04L 12/26* (2006.01)
*G06Q 30/02* (2012.01)

(52) U.S. Cl.
CPC ...... *G06F 17/30424* (2013.01); *G06F 17/3089* (2013.01); *G06Q 30/0201* (2013.01); *H04L 43/04* (2013.01); *H04L 43/0876* (2013.01); *H04L 43/10* (2013.01)

(58) Field of Classification Search
CPC ... G06F 17/30864; G06Q 10/10; G06Q 30/02
USPC .......................................................... 707/769
See application file for complete search history.

(56) References Cited

U.S. PATENT DOCUMENTS

| | | |
|---|---|---|
| 6,782,350 B1 | 8/2004 | Burnley et al. |
| 6,877,007 B1 | 4/2005 | Hentzel et al. |
| 7,185,085 B2 | 2/2007 | Bean |
| 7,783,719 B2 | 8/2010 | Miller |
| 7,949,563 B2 | 5/2011 | Collins |
| 8,234,370 B2 * | 7/2012 | Hammer et al. ............. 709/224 |

(Continued)

OTHER PUBLICATIONS

International Search Report & Written Opinion on PCT/US2013/036996 dated Jul. 31, 2013.

(Continued)

*Primary Examiner* — Scott A Waldron
*Assistant Examiner* — Dongming Wang
(74) *Attorney, Agent, or Firm* — Foley & Lardner LLP; John D. Lanza

(57) ABSTRACT

The subject technology provides configurations for providing aggregated analytics tracking data associated with a dynamically generated session in response to a query for analytics tracking data. A query for analytics tracking data associated with a period of time is received in which the analytics tracking data includes data for tracking activity associated with a web site or application. The subject technology determines analytics tracking data for aggregating according to the period of time in order to associate the aggregated analytics tracking data with a dynamically generated session. The aggregated analytics tracking data associated with the dynamically generated session is then provided in response to the query.

16 Claims, 10 Drawing Sheets

(56) References Cited

U.S. PATENT DOCUMENTS

| | | |
|---|---|---|
| 8,688,806 B2 | 4/2014 | Fullett |
| 8,725,794 B2 | 5/2014 | Kandasamy et al. |
| 8,949,340 B2 | 2/2015 | Smith et al. |
| 2002/0046281 A1 | 4/2002 | Cope |
| 2003/0046409 A1 | 3/2003 | Graham |
| 2004/0122943 A1 | 6/2004 | Error et al. |
| 2005/0010572 A1 | 1/2005 | Clark et al. |
| 2007/0039049 A1 | 2/2007 | Kupferman et al. |
| 2008/0086454 A1 | 4/2008 | Bahadori et al. |
| 2008/0086558 A1 | 4/2008 | Bahadori et al. |
| 2008/0208820 A1* | 8/2008 | Usey et al. .............. 707/3 |
| 2008/0270151 A1 | 10/2008 | Mahoney et al. |
| 2008/0294996 A1* | 11/2008 | Hunt et al. ............ 715/739 |
| 2008/0300909 A1 | 12/2008 | Rikhtverchik et al. |
| 2009/0019019 A1 | 1/2009 | Jones et al. |
| 2009/0094230 A1 | 4/2009 | Sakata et al. |
| 2009/0204704 A1 | 8/2009 | Muret et al. |
| 2010/0064040 A1 | 3/2010 | Wise et al. |
| 2010/0106598 A1* | 4/2010 | Grimes ................. 705/14.53 |
| 2011/0081052 A1 | 4/2011 | Bigioi et al. |
| 2011/0112862 A1 | 5/2011 | Yu |
| 2011/0282860 A1 | 11/2011 | Baarman et al. |
| 2012/0240019 A1 | 9/2012 | Nuzzi |
| 2012/0303552 A1 | 11/2012 | Zayas et al. |
| 2013/0061259 A1* | 3/2013 | Raman et al. ................ 725/14 |
| 2013/0073473 A1 | 3/2013 | Heath |
| 2013/0246609 A1 | 9/2013 | Topchy et al. |
| 2014/0120864 A1 | 5/2014 | Manolarakis et al. |
| 2014/0373133 A1 | 12/2014 | Foresti |

OTHER PUBLICATIONS

Office Action on U.S. Appl. No. 13/841,781 dated Feb. 13, 2015.
Office Action on U.S. Appl. No. 13/841,586 dated Apr. 27, 2015.
Office Action on U.S. Appl. No. 13/841,685 dated Apr. 15, 2015.
Office Action on U.S. Appl. No. 13/841,719 dated May 1, 2015.
Office Action on U.S. Appl. No. 13/841,586 dated Sep. 11, 2015.
Office Action on U.S. Appl. No. 13/841,781 dated Aug. 28, 2015.

\* cited by examiner

DYNAMIC SESSIONIZATION OF ANALYTICS DATA

CROSS-REFERENCE TO RELATED APPLICATIONS

The present application claims the benefit of priority under 35 U.S.C. §119 from U.S. Provisional Patent Application Ser. No. 61/641,850 entitled "System for Centralized Analytics Tracking Via Server-Side Sessionization," filed on May 2, 2012, the disclosure of which is hereby incorporated by reference in its entirety for all purposes.

BACKGROUND

Web site analytics involves the analysis and reporting of web site traffic data to an associated publisher. A publisher is an entity that owns and/or manages a particular web site. The publisher can monitor web site analytics data related to user visits and links to the web site by using web site analytics tools provided by third parties.

Existing analytics data systems work well for processing a high volume of web traffic data and/or application analytics data in order to provide interactive reports over substantial periods of time with high fidelity. These systems do not always accurately report web traffic data and/or application analytics data when changes are made to a publisher's web pages due to 1) different page configurations on respective pages, which can increase the difficulty in maintaining consistent business logic across the pages or 2) caching on the publisher's web site, which can result in inconsistent data being reported to a given web analytics system. Additionally, each request sent to a given analytics system can include one or more cookies, which increases the utilization of network bandwidth across the system.

In some instances, clients (e.g., various web browsers and/or applications) are required to provide local storage in order to persist state information in the aforementioned local storage. For instance, state information are included in cookies that are maintained and provided by such clients, and the cookies then transmitted to a given web analytics system in order to track sessions, provide information for online marketing campaigns, provide user information, and for tracking other client state information on the publisher's web site. However, certain clients (e.g., mobile clients such as mobile applications, users that have disabled cookies, etc.) do not always provide support for local storage in order to persist state information. In some instances, support for accessing local storage and/or cookies can vary across different clients, which can increase the difficulty in consistently maintaining state information across different clients. Consequently, existing web site analytics data systems can have difficulty in accurately reporting analytics data across a multitude of clients in view of the aforementioned issues.

SUMMARY

The subject technology provides for a machine-implemented method for providing aggregated analytics tracking data associated with a dynamically generated session in response to a query for analytics tracking data, the method including: receiving a query for analytics tracking data associated with a period of time in which the analytics tracking data includes data for tracking activity associated with a web site or application; determining analytics tracking data for aggregating according to the period of time in order to associate the aggregated analytics tracking data with a dynamically generated session; and providing the aggregated analytics tracking data associated with the dynamically generated session in response to the query.

Another aspect of the subject technology provides a system. The system includes memory, one or more processors and one or more modules stored in memory and configured for execution by the one or more processors. The system includes an analytics data query module configured to receive a query for analytics tracking data associated with a period of time in which the analytics tracking data includes data for tracking activity associated with a web site or application, determine analytics tracking data for aggregating according to the period of time in order to associate the aggregated analytics tracking data with a dynamically generated session, and provide the aggregated analytics tracking data associated with the dynamically generated session in response to the query.

The subject technology further provides a non-transitory machine-readable medium including instructions stored therein, which when executed by a machine, cause the machine to perform operations including: receiving a query for analytics tracking data associated with a period of time in which the analytics tracking data includes data for tracking activity associated with a web site or application; determining analytics tracking data for aggregating according to the period of time in order to associate the aggregated analytics tracking data with a dynamically generated session; and providing the aggregated analytics tracking data associated with the dynamically generated session in response to the query.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Several configurations of the subject technology are set forth in the following figures.

DETAILED DESCRIPTION

Figure 1:
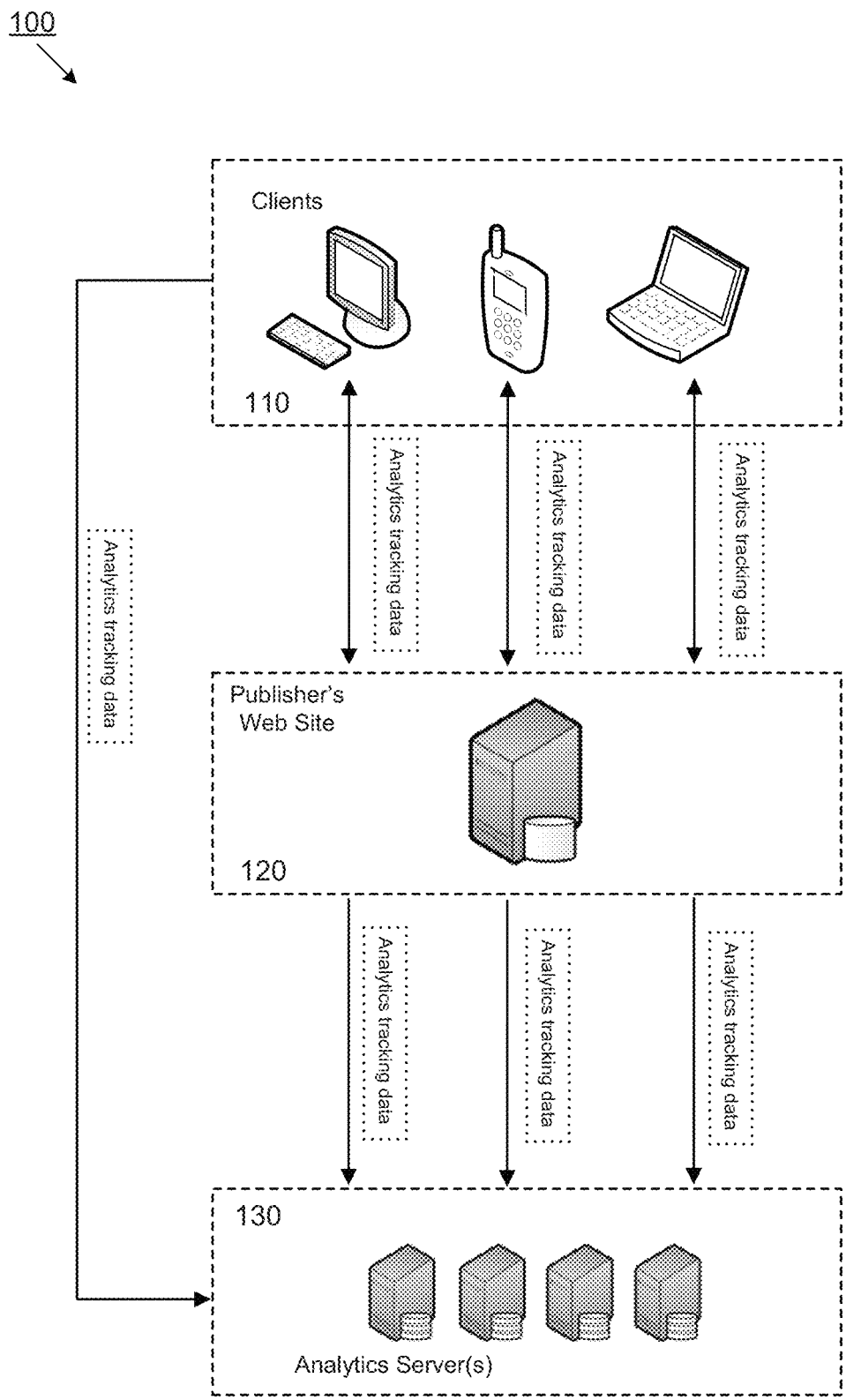
FIG. 1 conceptually illustrates an example communication flow in an analytics tracking system for receiving and processing web site tracking data in the form of analytics tracking data communications.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

To use a web site analytics data system, a publisher typically provides tracking instructions embedded in the web site's web pages (alternatively or conjunctively, by providing code in its web page that requests the tracking instructions from an analytics server). For instance, the tracking instructions are a small region of JavaScript™ code that the publisher includes in each page of the publisher's web site for which traffic is to be tracked. When a web page is rendered by a user device and/or client (e.g., web browsers, mobile devices, tablet devices, thin clients, thick clients, etc.), the tracking instructions are executed, which collects visitor data and/or other analytics tracking data and sends it back to an analytics server in the form of an analytics tracking data communication ("hit") for processing. One method of sending the analytics tracking data communication is to send it as part of a Hypertext Transfer Protocol (HTTP) request.

Web site traffic data can be in the form of the aforementioned analytics tracking data communications (e.g., HTTP requests or "hits" that are generated from various user devices and/or clients). Analytics tracking data can be created upon accessing a resource (e.g., web page, image file, banner ad, audio file, etc.) on the web site by a particular visitor to a publisher's web site, or in response to an event on a web page or publisher's web site. The analytics tracking data can be sent in batch as included in one or more analytics tracking data communication(s) when there is a network connection, or alternatively included in a respective analytics tracking data communication that is triggered upon an access to a web page or resource on the web site or in response to an event on the web page or publisher's web site. For the purpose of web site analytics reporting, the associated web site tracking data (e.g., included in associated HTTP requests) can include a web property ID (e.g., an account identifier that identifies a publisher's analytics account for a particular web site), visitor identity data (e.g., anonymized identifier corresponding to a unique client device), an event statistic(s) (such as a timestamp of the current web page communication), and user data such as location data (i.e., geographical information) associated with the visitor to the publisher's web site. The amount and types of events/information that are reported in the tracking data can be specified by the publisher (e.g., to account for particular information that a publisher wishes to track as web site analytics data).

Although an analytics tracking data communication is described as including web site traffic data, an analytics tracking data communication is not limited to including web site traffic data. In particular, an analytics tracking data communication can include data from any source (e.g., application, platform, etc.) that is utilized for tracking an activity associated with the source. For example, in a mobile application platform, an analytics tracking data communication can include analytics tracking data that tracks an event associated with an activity within the mobile application platform. In this example, the analytics tracking data associated with the mobile application platform may not include web site traffic data because the mobile application platform does not require the use of a client such as a web browser. Aspects of the herein described analytics tracking system therefore can be configured to receive and process an analytics tracking data communication(s) including different forms of analytics tracking data that are outside the scope of web site tracking data. As used herein, the phrase "analytics tracking data" may include web site tracking data and/or other types of analytics tracking data other than web site tracking data (e.g., application tracking data).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server. Moreover, as described herein, demographic-related data may be aggregated for one or more groups of users so that an individual user(s) is not personally identifiable.

I. Centralized Analytics Tracking Via Server-Side Sessionization

Current analytics systems provide for aggregating and reporting of web site traffic data. However, current analytics systems typically require that clients (e.g., various web browsers) implement logic for providing a session associated with each analytics tracking data communication (e.g., request) that is transmitted to a given web analytics system. A session associated with a visit to a publisher's web site can be used by the analytics system to associate requests and other tracking data to a particular client (e.g., web browser). In one example, each session can include a series of requests from a uniquely identified client with 1) a time of no more than predetermined amount (e.g., 30 minutes) between requests, and 2) no requests for pages from other domains (e.g., other web sites) intervening between requests.

As used herein, the term "sessionization" refers to a technique or techniques for providing a session and associating the session to one or more requests (e.g., analytics tracking data communications) corresponding to visitor activity from a uniquely identified client. The uniquely identified client can be associated with a respective visitor (e.g., user) to the publisher's site. Further, sessionization can include techniques for providing/associating campaign information to each incoming request. As used herein, campaign information may include a page Uniform Resource Identifier (e.g., page URI) or referrer path that indicates whether incoming traffic to a particular landing page is from an organic campaign (e.g., from a web search), an explicit campaign defined by ad keywords, a referral campaign from another website, or a direct campaign. In one example, campaign information may identify a particular marketing campaign corresponding with a set of associated marketing activities. For instance, the associated marketing activities can respectively correspond to a set of web pages on the publisher's web site. Any visitor activity/action related to the set of web pages on the publisher's web page can then be associated with the marketing campaign. In this manner, the campaign information can identify the marketing campaign associated with the visitor action(s).

In current web analytics systems, sessionization occurs on the client-side without the involvement of a given web analytics system. Each client, however, can implement the logic for providing sessions differently, which can result in inconsistent sessionization of requests received by the web analytics system.

To address the aforementioned issues with client-side sessionization, the subject technology is directed to an analytics tracking system which implements, on the server side, sessionization of incoming requests or analytics tracking data communications to an analytics tracking server. As a result, clients can transmit "raw" hit or request information in each analytics tracking data communication (e.g., without performing sessionization beforehand) which include a smaller subset of analytics tracking data that is transmitted to the analytics tracking server. For instance, in contrast to existing web analytics systems, analytics tracking data transmitted from a client(s) does not include session information and/or campaign information from prior sessions. Moreover, a first "raw" hit can contain campaign information. However, the campaign information is no longer required to be stored in cookies, so that all subsequent hits will not contain the campaign information given that the analytics tracking server as described herein can propagate the campaign information on the server-side. Consequently, network bandwidth can be preserved and errors on the client-side can be reduced.

Client-side sessionization typically provided some (or all) of the aforementioned web site tracking (e.g., session information, visitor information, campaign information, etc.) in one or more first party cookies (e.g., cookies that originated from the publisher's site), which are then included in analytics tracking data communications transmitted to a given web analytics server. The herein described analytics tracking system minimizes (or even eliminates) reliance on cookies to track analytics data by performing sessionization on the server side.

FIG. 1 conceptually illustrates an example communication flow in an analytics tracking system 100 for receiving and processing web site tracking data in the form of analytics tracking data communications. The analytics tracking system 100 includes one or more clients 110. Clients include different computing devices such as mobile devices, netbooks, laptops, desktop computers, etc. Upon accessing a resource on a publisher's web site 120 (such as a web page, link, image, etc.), a client transmits web site tracking data as an analytics tracking data communication to an analytics server 130. In another example, processed data from the publisher's web site 120 can be transmitted to the clients 110, and then the clients 110 can subsequently transmit analytics tracking data to an analytics server 130.

Although the example system 100 in FIG. 1 illustrates a communication flow involving web site tracking data, it should be understood that any type of analytics tracking data can be included in the system 100 and still be within the scope of the subject technology. Moreover, FIG. 1 shows an example in which web site tracking data is passed from the client 110 to the publisher's web site 120 and then to the analytics server 130. However, as mentioned before, each client can directly transmit analytics tracking data to the analytics server 130 (e.g., bypassing the publisher's web site 120) for processing as further shown in FIG. 1. In one example, the publisher's web site includes the code/instructions for the data that the clients should send to the analytics server 130. In another example for tracking analytics data from an application on a client, logic is included in the application for communication with the analytics server 130.

Web site tracking data can be transmitted via a network, which can include, but is not limited to, a local network, remote network, or an interconnected network of networks (e.g., Internet). Moreover, the clients 110, publisher's web site 120 and analytics server 130 can be configured to communication over any type of network, such as a local area network, a wide area network, or an interconnected network of networks (e.g., the Internet) and by using any sort of network/communications protocol (Transmission Control Protocol and Internet Protocol (TCP/IP), HTTP, etc.).

In one example, instead of a single analytics server 130, the analytics system can include a respective cluster of servers/computers that perform a same set of functions in a distributed and/or load balanced manner. A cluster can be understood as a group of servers/computers that are linked together to seamlessly perform the same set of functions, which can provide performance, reliability and availability advantages over a single server/computer architecture. In an example with a group of servers, the analytics system may be configured to route event tracking communications associated with a unique visitor and/or a particular session to the same server within the group of servers for processing.

Moreover, one or more different tiers of servers can be included for processing analytics tracking data associated with web analytics. In one example, a multi-tiered system can include a tier of collecting servers for receiving incoming analytics tracking data communications (e.g., HTTP requests for logging web page requests at corresponding web sites). A collecting server among the tier of collecting servers that receives an incoming communication can determine a particular logging server in a lower tier to route the incoming communication. Upon receiving the incoming communication, the logging server processes the communication by routing the communication to a tier of long-term storage servers for persistent storage. Incoming analytics tracking data communications can then be routed to a tier of one or more analytics servers (e.g., from the collecting tier).

Irrespective of whether a single server or multiple analytics servers are provided, each analytics server implements session logic in order provide sessionization of incoming web site tracking data received in analytics tracking data communications. In the following description, an example process for sessionizing an analytics tracking data communication from a unique visitor is described in further detail.

Figure 2:
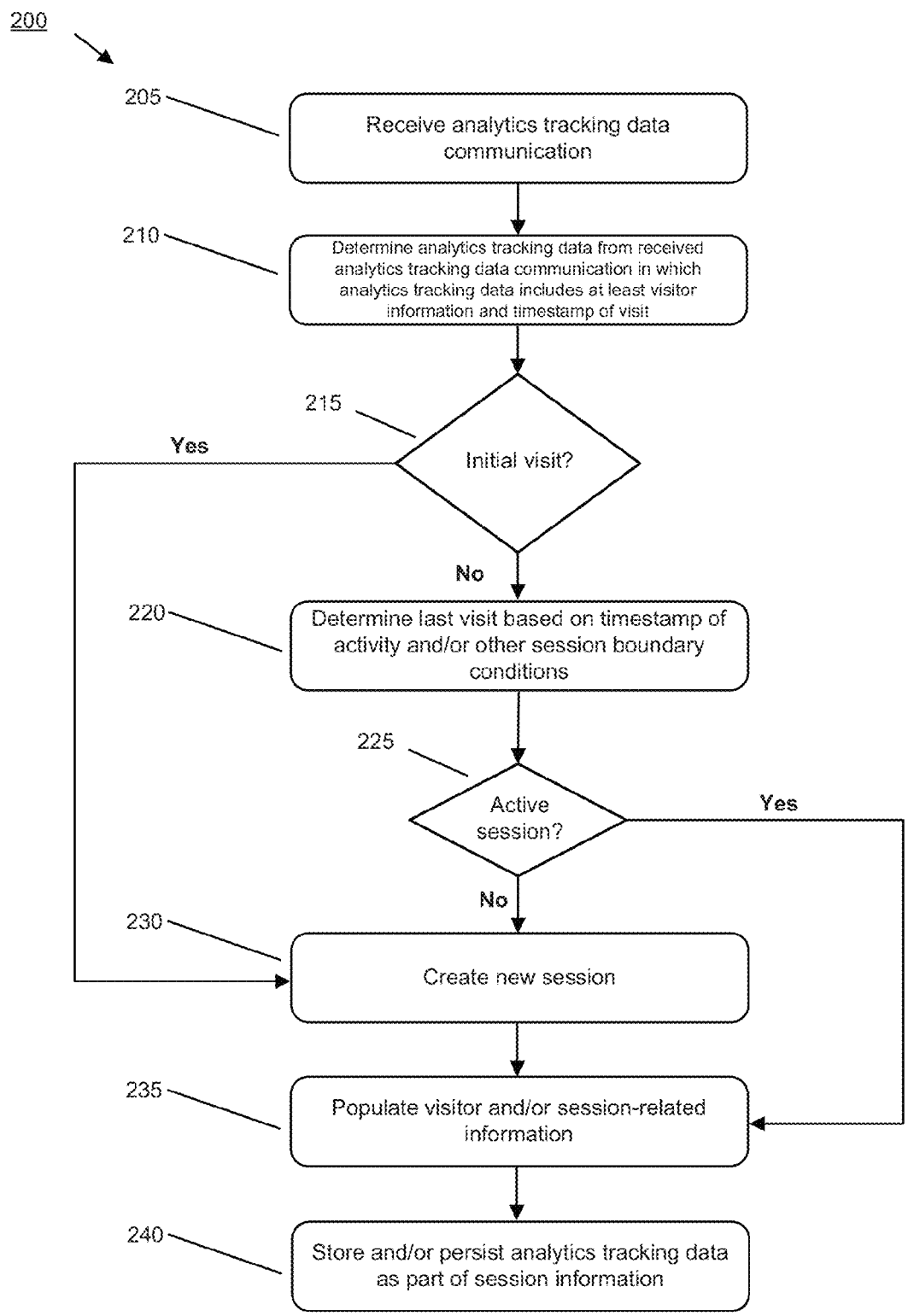
FIG. 2 conceptually illustrates an example process for routing an analytics tracking data communication for persistent and temporary storage of some configurations.

FIG. 2 conceptually illustrates an example process 200 for generating session information based on an analytics tracking data communication of some configurations. More specifically, FIG. 2 illustrates the process performed by an analytics server to sessionize analytics tracking data communications based on analytics tracking data included in an analytics tracking data communication.

The process 200 starts at 205 when an analytics tracking data communication is received. Referring to FIG. 1, an analytics tracking data communication is received by the analytics server 130 after one of the clients 110 accesses a resource (e.g., web page, link, image, etc.) on the publisher's web site 120.

The process 200 at 210 determines analytics tracking data from the received analytics tracking data communication. In one example, the analytics tracking data includes at least visitor information. For instance, visitor information can include a unique ID string associated with a unique visitor that accesses the publisher's web site. The visitor information does not necessarily identify a particular end-user. For example, the visitor information can be a anonymized identifier that is determined based on different information such as the visitor's web browser or client, the visitor's hostname, IP address, etc. Additionally, the analytics tracking data also includes a timestamp that represents a time and/or date in which the unique visitor visited the publisher's web site (e.g., activity indicating access of a resource on the publisher's web site). A timestamp in some implementations is a sequence of alphanumeric characters that denotes the date and/or time in which a particular event occurred. In some instances, a client can inaccurately report a time in which an event occurred (e.g., due to an incorrect clock reading and/or setting). To address this issue, in one example, a timestamp represents a delta or an elapsed amount of time in which an event was recorded/detected by a client to when the event was transmitted as part of the analytics tracking data to the analytics server.

The process 200 at 215 determines if an initial visit for the unique visitor has occurred. In one example, this determination is made based on whether the unique visitor has any record of visiting the publisher's web site. For example, if a prior timestamp or other analytics data does not exist for the unique visitor, the process 200 determines that the received analytics tracking data communication is an initial visit to the publisher's web site for the unique visitor. In an instance where no such record is found for the unique visitor, the process 200 continues to 230 to create a new session for the unique visitor. In one example, a new session can be created by storing the timestamp from the analytics tracking data to indicate a start time of a new session for the unique visitor.

Alternatively, if it is determined that this is not the initial visit for the unique visitor (e.g., the unique visitor has previously visited the publisher's web site), the process 200 continues to 220 to determine a last visit of the unique visitor based on a timestamp. In one example, the process 200 can determine the last visit based on a prior timestamp of previous activity associated with the unique visitor (e.g., a timestamp included in previously received analytics tracking data). The timestamp can be understood as one example of a session boundary condition. However, the process 200 can utilize other session boundary conditions to determine an initial visit for the unique visitor. For instance, the process 200 determines a last visit of the unique visitor based on other session boundary conditions. By way of example, other session boundary conditions can include new campaign information, a session marker indicating a new session, or a session timeout. Each of the aforementioned session boundary conditions can indicate that a new session should be created for the unique visitor. Additional types of session boundary conditions can be considered and still be within the scope of the subject technology.

Based on the determination at 220, the process 200 continues to 225 to determine if an active session exists for the unique visitor. In one example, an active session can be determined by looking up a stored timestamp that indicates when the active session started. In some configurations, after predetermined time of inactivity (e.g., 30 minutes), a session is considered inactive or expired (e.g., session timeout). Thus, if it is determined that there is no active session (e.g., no timestamp indicating when the active session started, or if the timestamp is older than a predetermined time period, etc.), the process 200 continues to 230 to create a new session for the user. Further, as described above, each of the aforementioned session boundary conditions determined at 220 (e.g., new campaign information, session marker, session timeout, etc.) can indicate that a new session should be created (effectively determining that an active session does not exist), and the process 200 then continues to 230. Alternatively, if an active session exists, the process 200 continues to 235 to populate visitor and/or session-related information as further described below.

After creating the new session at 230 (e.g., coming from either 215 or 225) or determining that an active session exists at 225, the process 200 continues to 235 to populate visitor and/or session-related information. For instance, the analytics server determines, based on configuration information associated with one or more pages of the publisher's web site, visitor and/or session-related information to populate with the received analytics tracking data. Further, the visitor and/or session-related information is based on analytics data included in the received analytics tracking data, such as visitor information or campaign information. For example, campaign information can be populated with the received analytics tracking data. In one example, the campaign information includes a name for a marketing campaign (e.g., "Product XYC," "Local Sports Event," "Famous Person," etc.). As described before, the campaign information identifies a particular marketing campaign corresponding with a set of associated marketing activities. For instance, the associated marketing activities can respectively correspond to a set of web pages on the publisher's web site. Any visitor activity/action related to the set of web pages on the publisher's web site can then be associated with the marketing campaign.

The process 200 at 240 stores and/or persists the analytics tracking data including the campaign information. In one example, the analytics tracking data is stored in non-persistent storage on a temporary basis before being committed to persistent storage in some configurations. In one example, the process 200 stores the analytics tracking data in a web properties table stored in memory (e.g., random access memory) of the analytics server. For instance, the analytics tracking data may be segmented according to the campaign information. The process 200 then ends.

In addition, the analytics server can delay writing the analytics tracking data stored in non-persistent storage to (permanent or long-term) persistent storage after a predetermined period of time has elapsed. For instance, the analytics server can wait until all analytics data is received for a particular day, and once the sessionization data has stabilized for that day, the server will then write the analytics data (permanently) to persistent storage on the following day. In this manner, the analytics server can account for changes to any state information associated with incoming analytics tracking data.

II. Centralized Server-Side Configuration Driven Sessionization to Provide Consistent Business Logic In a given web analytics system, each page on a publisher's site is configured separately (even with the same attributes). For example, each page can include lists for search engines (e.g., for tracking referrals, organic traffic, etc.), cookie timeout/expiration setting, session timeout/expiration setting, etc. However, per-page configuration is prone to error (e.g., search engine list is incorrect or timeout information was set incorrectly for one of the pages on the publisher's site). Further, modifications of configuration may not immediately reflect to all the clients due to HTTP caching. Consequently, the publisher (e.g., developers responsible for the pages) has the burden to provide and maintain similar configurations on all pages for client-side sessionization to be performed consistently.

To address the above issues, the subject technology provides for server-side configuration of resources (e.g., web pages, etc.) on a publisher's web site to provide consistent sessionization of incoming analytics tracking data communications (e.g., requests from clients including analytics tracking data for unique visitors).

Figure 3:
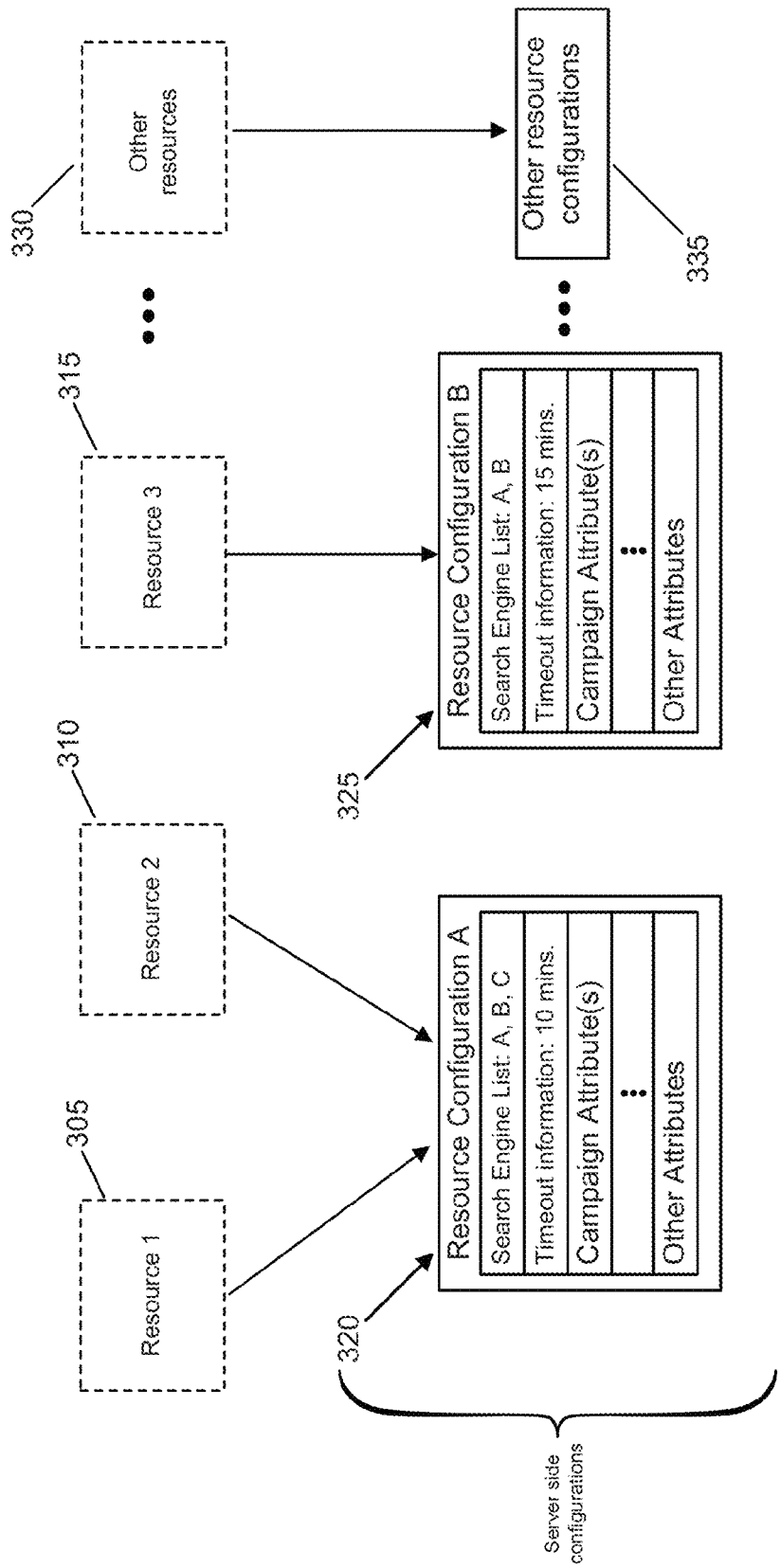
FIG. 3 conceptually illustrates various attributes that are included in example resource configurations for one or more pages of a publisher's web site.

FIG. 3 conceptually illustrates various attributes that are included in example resource configurations for one or more pages of a publisher's web site. In one example, an analytics server stores one or more resource configurations that respectively correspond to different pages from the publisher's web site. In this fashion, the business logic (based on the resource configurations) for sessionization of visitor activity from analytics tracking data is provided at the server-side. Thus, any changes to the resource configurations are reflected immediately without the potential for not being properly applied during sessionization due to caching on the client-side or publisher's web site or incorrect configuration on the client-side or publisher's web site.

As illustrated, FIG. 3 includes different resources 305, 310, 315 and 330 corresponding to different resources (e.g., web pages) on a publisher's web site. At the analytics server, resource configurations 320, 325 and 335 are provided. As shown, resources 305 and 310 correspond to resource configuration 320, and resource 315 corresponds to resource configuration 325. The resource configuration 320 includes different attributes in comparison with the resource configuration 325. For instance, the respective search engine lists and timeout attributes are different for resource configurations 320 and 325. In one example, timeout attributes can include timeouts for session timeout/expiration (e.g., 30 minutes) and/or campaign timeout/expiration (e.g., 6 months). As further shown, resource configurations 320 and 325 include one or more campaign attributes and other attributes. In one example, other attributes include attributes related to visitor attributes, custom attributes, etc. The analytics server can also include other resource configurations 335 for other pages from the publisher's web site.

Although the example resource configurations shown in FIG. 3 include a set of attributes, it should be understood that each resource configuration is not required to include all of the attributes shown in FIG. 3. Additionally, each resource configuration can include other attributes not illustrated in the example of FIG. 3 and still be within the scope of the subject technology.

In the following section, an example process for applying a resource configuration during sessionizing an analytics tracking data communication from a unique visitor is described in further detail.

Figure 4:
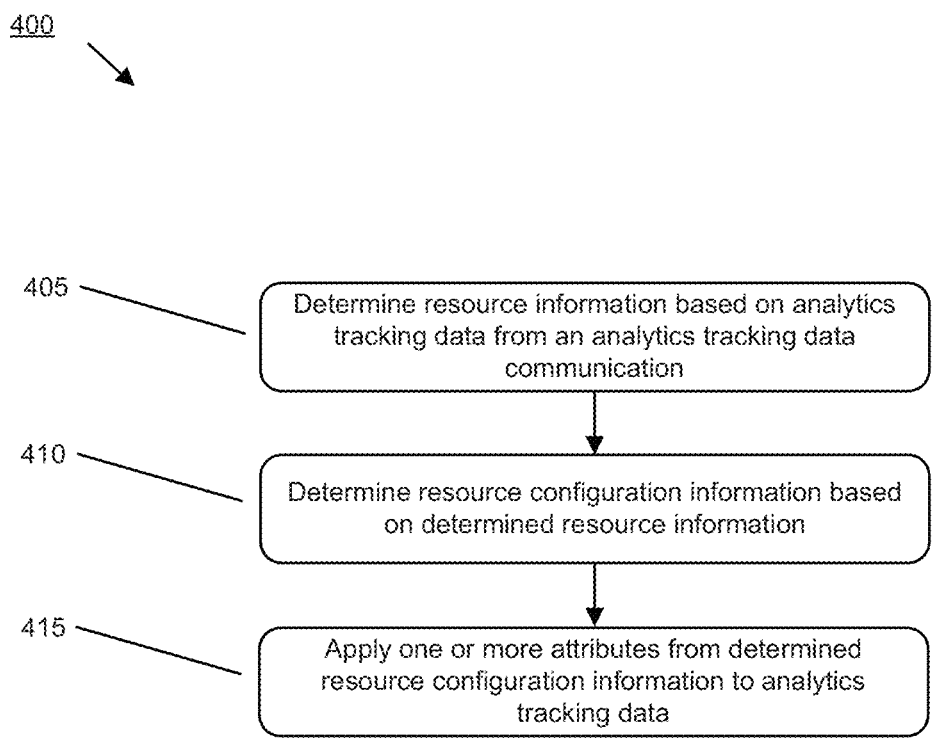
FIG. 4 conceptually illustrates an example process for determining resource configuration information for applying to analytics tracking data.

FIG. 4 conceptually illustrates an example process 400 for determining resource configuration information for applying to analytics tracking data. More specifically, FIG. 4 illustrates the process performed by an analytics server to apply resource configuration information in order to sessionize analytics tracking data communications based on analytics tracking data included in an analytics tracking data communication. In one example, the process 400 can be performed conjunctively with the process 200 described by reference to FIG. 2.

As described before, web site traffic data can be in the form of the aforementioned analytics tracking data communications (e.g., HTTP requests or "hits" that are generated from various user devices and/or clients). Each analytics tracking data communication can be triggered upon loading of a web page or resource (e.g., image file, banner ad, audio file, etc.) on the web site by a particular visitor to a publisher's web site. For the purpose of web site analytics reporting, the associated web site tracking data (e.g., included in associated HTTP requests) can include a web property ID (e.g., an account identifier that identifies a publisher's analytics account of a particular web site), visitor identity data (e.g., anonymized identifier corresponding to a unique client device), an event statistic(s) (such as a timestamp of the current web page communication), and user data such as location data (i.e., geographical information) associated with the visitor to the publisher's web site.

The process 400 begins at 405 by determining resource information based on analytics tracking data from an analytics tracking data communication (e.g., received by the analytics server in a request). In one example, the resource information includes information identifying a page from the publisher's web site in which the visitor activity or event occurred. The process 400 at 410 determines resource configuration information based on the determined resource information. The process 400 at 415 applies one or more attributes from the determined resource configuration to the analytics tracking data. In one example, the analytics server applies the attributes during sessionization of a received analytics tracking data communication as described before in FIG. 2. The process 400 then ends.

III. Persist and Process Analytics Data Dimensions for Server-side Sessionization Analytics data (e.g., campaign information, visitor activity, etc.) are stored locally on the client via cookies. However, reliance on client-side cookies can have several weaknesses: 1) unreliability due to cookies being deleted or not supported on certain clients and 2) each hit on a publisher's web site that reports analytics data sends redundant information (e.g., in one or more cookies) to a given analytics server. Further, as described before, the utilization of cookies increases an amount of network bandwidth required for transmitting (on the client-side) and receiving (on the server-side) cookies.

As described before, analytics tracking data based on visitor activity ("web site tracking data") can be included in the aforementioned analytics tracking data communications (e.g., HTTP requests or "hits" that are generated from various user devices and/or clients). Each analytics tracking data communication can be triggered upon loading of a web page or resource (e.g., image file, banner ad, audio file, etc.) on the web site by a particular visitor to a publisher's web site. For the purpose of web site analytics reporting, the associated web site tracking data (e.g., included in associated HTTP requests) can include a web property ID (e.g., an account identifier that identifies a publisher's analytics account of a particular web site), visitor identity data (e.g., anonymized identifier corresponding to a unique client device), an event statistic(s) (such as a timestamp of the current web page communication), and user data such as location data (i.e., geographical information) associated with the visitor to the publisher's web site. However, in existing web analytics systems, redundant analytics tracking data is included in each analytics tracking data communication that is transmitted to a given web analytics system.

To address the aforementioned issues, the subject technology further provides for propagating analytics tracking data from an initial incoming analytics tracking data communication received from a unique client (e.g., visitor to a publisher's web site) to subsequently received analytics tracking data communications from the unique client.

Figure 5:
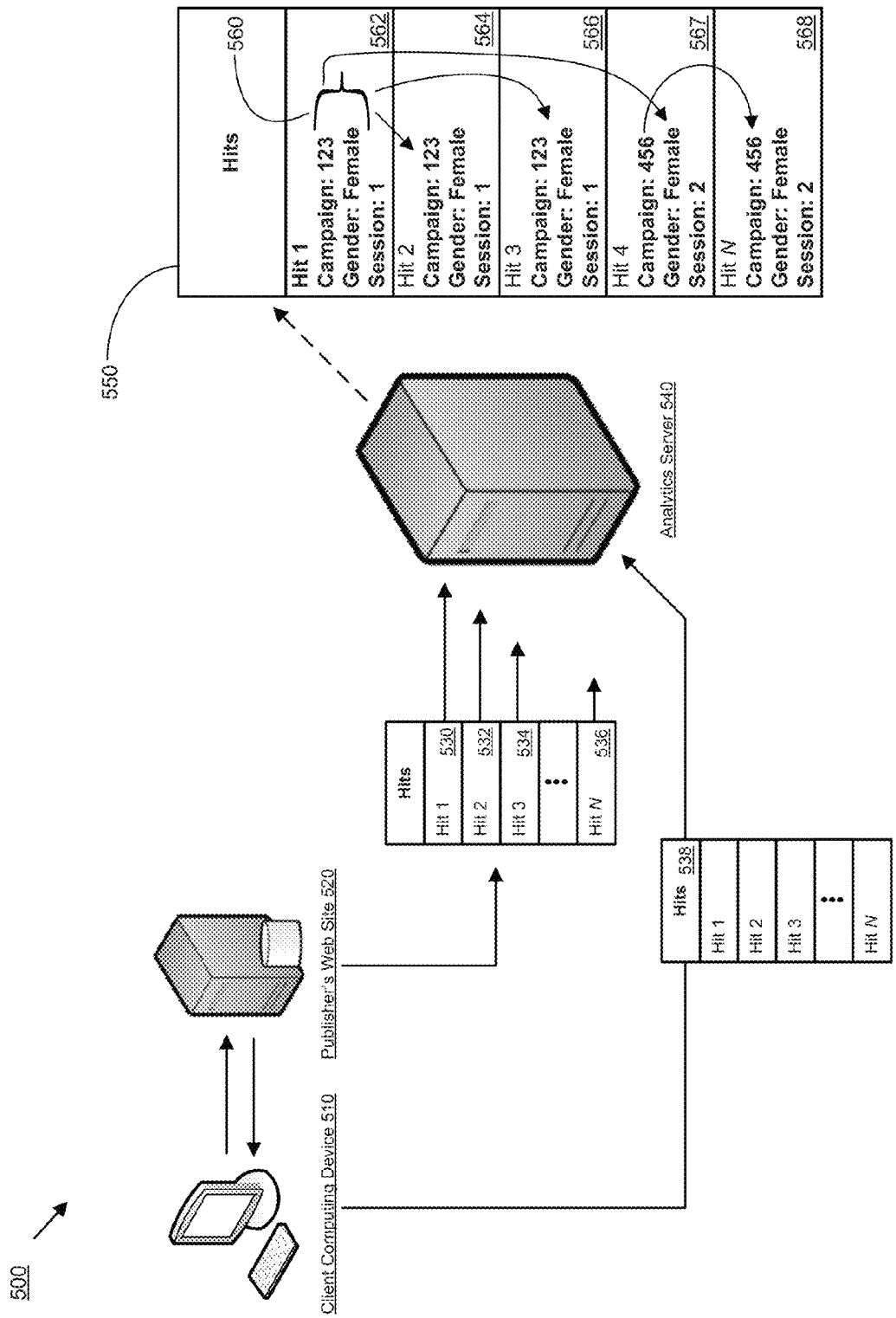
FIG. 5 conceptually illustrates an example communication flow in an analytics tracking system from a client computing device to an analytics server for propagating information from an initial analytics tracking data communication to subsequent analytics tracking data communications.

FIG. 5 conceptually illustrates an example communication flow in an analytics tracking system 500 from a client computing device to an analytics server for propagating information from an initial analytics tracking data communication (e.g., for a new session) to subsequent analytics tracking data communications.

As illustrated, the analytics tracking system 500 includes a client computing device 510, a publisher's web site 520 and an analytics server 540. In the example shown in FIG. 5, the client computing device 510 visits the publisher's web site 520 and accesses several resources hosted on the publisher's web site, which are then reported to the analytics server 540 as different analytics tracking data communications. For each visitor action, the publisher's web site 520 can transmit a response communication in order to set one or more cookies on the client computing device 510. Further, for each visitor action on the publisher's web site 520 by the client computing device 510, a respective hit (e.g., corresponding to a respective analytics tracking data communication) is transmitted to the analytics server 540. In one example, a first hit 530 (shown as "Hit 1") represents an initial visitor activity tracked on the publisher's web site 520 that is reported to the analytics server 540. Subsequent hits 532, 534 and 536 for subsequent visitor activity are then reported to the analytics server 540. In some instances, as further shown in FIG. 5, one or more hits 538 can be transmitted from the client computing device 510 to the analytics server 540.

At the analytics tracking server 540, incoming analytics tracking data communications can be stored in a table 550 (or similar data structure) for tracking different analytics data from the analytics tracking data communications. As shown, the table 550 includes analytics data 562 corresponding to the first hit 530. In one example, the analytics data 562 can include one or more dimensions corresponding to different attributes 560 such as campaign information, gender of a unique visitor, and session information. In one example, the gender of the unique visitor can be provided based on user profile information of the unique visitor on the publisher's web site. Other dimensions for other attributes can be included in the analytics data 562 and still be within the scope of the subject technology. The different attributes for the different dimensions are stored by the analytics server 540 for future retrieval. In this manner, subsequent hits reporting visitor activity on the publisher's web site 520 are not required to include such attributes. For instance, JavaScript™ code on the publisher's web site is included on a set of pages to instruct the client to only include certain attributes upon a particular visit from the unique client. In subsequent visits to the publisher's web site, the attributes are not included in analytics tracking data communications transmitted to the analytics server. For each subsequent incoming analytics tracking data communication, the analytics server propagates the stored attributes 560 to analytics data 564, 566, 567 and 568. As further shown, the analytics data 567 includes state changing information (e.g., "Campaign: 456") that has been propagated to Hit N in 568, which is an example of partial propagation of an attribute described in further detail below.

Figure 6:
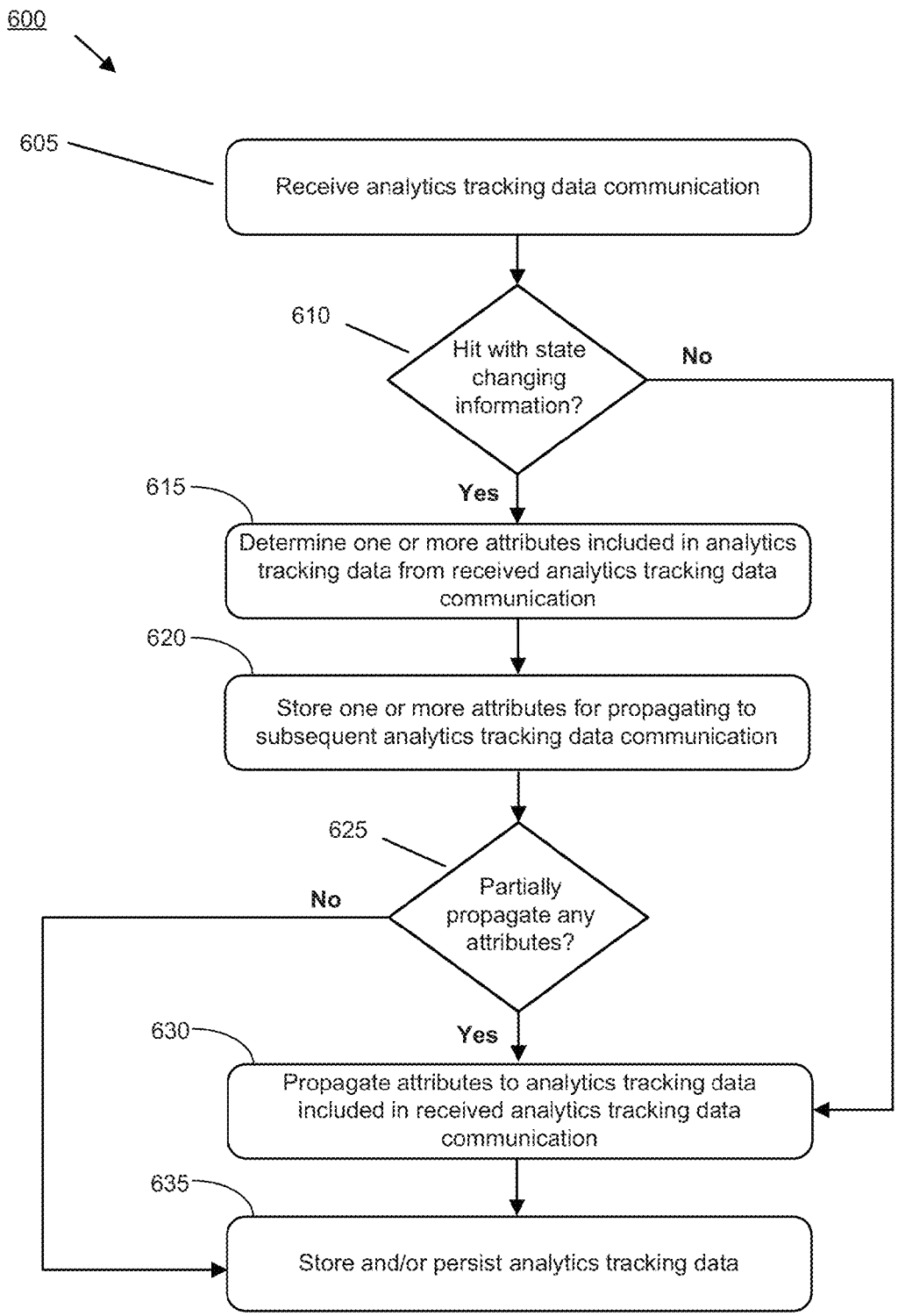
FIG. 6 describes an example process for propagating information from an initial analytics tracking data communication to subsequent analytics tracking data communications at an analytics server.

FIG. 6 describes an example process 600 for propagating information from an initial analytics tracking data communication to subsequent analytics tracking data communications at an analytics server.

The process 600 begins at 605 by receiving an analytics tracking data communication. The process 600 at 610 determines if the analytics tracking data communication is a hit with state changing information based on analytics tracking data included in the received analytics tracking data communication. State changing information can include new campaign information, new visitor information, etc. Other types of state changing information can be considered and still be within the scope of the subject technology.

If it is determined at 610 that the received analytics tracking data communication is a hit with state changing information, the process 600 continues to 615 to determine one or more attributes from analytics tracking data included in the analytics tracking data communication. By way of example, for each attribute included in the analytics tracking data, the process 600 makes a determination whether the attribute (e.g., the attribute includes state changing information) should be stored in order to propagate to other hits.

The process 600 at 620 then stores the one or more attributes for propagating to other analytics tracking data communications. In one example, the one or more attributes can include state changing information (e.g., new campaign information) as described above. The process 600 at 625 then determines if any existing attributes should be partially propagated to the (current) received analytics tracking data. For instance, it is possible that previously received analytics tracking data now stored at the analytics server includes gender information for a visitor that should be propagated to the received analytics tracking data. If any existing attributes should be propagated, the process 600 continues to 630 to propagate such attributes to the analytics tracking data included in the received analytics tracking data communication. The process 600 then continues to 635 to store and/or persist the analytics tracking data including the propagated attribute(s). In one example, the analytics tracking data is stored in non-persistent storage on a temporary basis before being committed to persistent storage in some configurations. Alternatively, if a determination is made that no attribute should be propagated at 625, the process 600 continues to 635 to store the analytics tracking data.

If the process 600 determines at 610 that the received analytics tracking data communication is not a hit with state changing information, then the process 600 continues to 630 in order to propagate any stored attributes to analytics tracking data included in the received analytics tracking data communication. The process 600 then continues to 635 to store the analytics tracking data including the propagated attributes. The analytics tracking data is stored in non-persistent storage on a temporary basis before being committed to persistent storage in some configurations. In this manner, additional analytics data corresponding to one or more different dimensions are applied to this subsequent analytics tracking data and is consistent with the initial analytics tracking data communication reported to the analytics server. The process 600 then ends.

In addition, the analytics server can delay writing the analytics tracking data stored in non-persistent storage to (permanent or long-term) persistent storage after a predetermined period of time has elapsed. For instance, the analytics server can wait until all analytics data is received for a particular day, and once the state changing data (e.g., one or more attributes) has stabilized for that day, the server will then write the analytics data (permanently) to persistent storage on the following day. In this manner, the analytics server can account for changes to any state information associated with incoming analytics tracking data.

IV. Dynamic Sessionization of Analytics Data

In a typical analytics system, analytics data for visitor activity ("hit" or "hits") at a publisher's web site is sessionized at the client-side and then reported to a web analytics server for processing as different hits. These hits are received by a web analytics server and then stored according to campaign information and/or session information included in the hits. However, the network connectivity of some client computing devices (such as mobile devices) could be unreliable in some instances. Moreover, given the distributed nature of the analytics tracking system in one example (e.g., the system is hosted on several distributed servers), it is possible that hits are received out of order due to different buffers and delays of each server. In these instances, hits for a particular session can be received late (and/or out of order) past the lifetime of forming the session. Prior to receiving a late hit for a session, a query of analytics data corresponding to the session would not be accurate. Thus, analytics data already stored by the web analytics server may not accurately reflect visitor activity at the publisher's web site for corresponding campaigns or sessions in which hits are received late.

In an example in which a late hit included new campaign information, the web analytics server would have to perform further processing (e.g., deletion and modification of existing analytics data erroneously associated with a different campaign) to update the stored analytics data to reflect the new campaign information. For instance, a given analytics tracking system would immediately commit analytics tracking data to persistent storage. In the event of a late hit including new campaign information and before the analytics data is updated, any query to the analytics server for the analytics data would not be accurate with respect to the visitor activity for a particular campaign. Thus, it can be advantageous to delay committing analytics tracking data to persistent storage in light of potentially receiving late hits.

In the herein described analytics tracking system in which sessionization of analytics data is performed at an analytics server, the analytics data that is reported to the analytics server is often received without any session and/or campaign information (e.g., the analytics data is "stateless"). Thus, the analytics server performs sessionization at the server-side in order to determine an existing session or create a new session for analytics data, and then populates campaign information for the analytics data associated with the session.

To address the aforementioned issues, the subject technology provides configurations for dynamically sessionizing analytics tracking data stored by the analytics server for responding to a query for analytics tracking data. In light of potentially receiving late hits, the analytics server performs dynamic sessionizing of analytics tracking data instead of relying on previously committed analytics tracking data in persistent storage, which may not accurately reflect new campaign information received in a late hit. More specifically, any received tracking data is not immediately committed to persistent storage and, in one example, kept in non-persistent storage on a temporary basis. The analytics server can then delay committing the analytics tracking data after a specified period of time (e.g., in the following day) to account for late hits that contain new campaign information.

As described before, analytics tracking data based on visitor activity ("web site tracking data") on a publisher's web site can be included the aforementioned analytics tracking data communications (e.g., HTTP requests or "hits" that are generated from various user devices and/or clients) that are received and processed by the analytics server.

Figure 7:
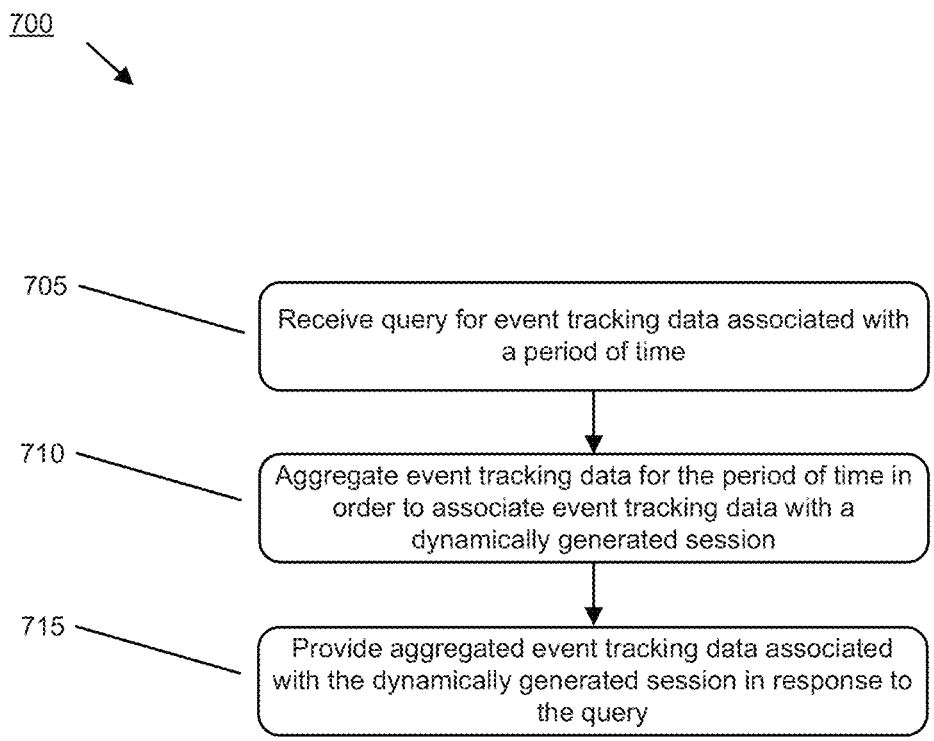
FIG. 7 describes an example process for providing aggregated analytics tracking data associated with a dynamically generated session in response to a query for analytics tracking data.

FIG. 7 describes an example process 700 for providing aggregated analytics tracking data associated with a dynamically generated session in response to a query for analytics tracking data. The process 700 can be performed by the analytics server in one example.

The process 700 begins at 705 by receiving a query for analytics tracking data associated with a period of time. In one example, the period of time can cover a particular day (or any sub-period of time therein) in which analytics data is being reported to the analytics server. The process 700 at 710 aggregates analytics tracking data for the period of time in order to associate the aggregated analytics tracking data with a dynamically generated session. In one example, the server dynamically generates a session in response to the received query. The server will then aggregate, for a unique visitor, analytics tracking data already received by the server that fall within the period of time based on the query. Given that the analytics data can be delayed for being committed to persistent storage, it should be understood that the aggregation of analytics tracking data can include analytics tracking data already committed in persistent storage and/or analytics tracking data that has yet to be committed to persistent storage (e.g., the data is currently stored on a temporary basis) for the period of time specified in the query. In view of the above, if new campaign information is received in a late hit, the dynamically generated session of the aggregation of analytics tracking data will be based on the new campaign information. In this manner, the process 700 can provide up-to-date analytics tracking data based on the new campaign information.

At 715, the process 700 provides the aggregated analytics tracking data associated with the dynamically generated session in response to the query. The dynamically generated session can be understood as a "throw away" or temporary session that is utilized for responding to a query request. By utilizing a dynamically generated session, the analytics server can provide up-to-date analytics tracking data in response to a query because sessionization occurs on-the-fly. Instead of immediately committing the analytics tracking data and relying on such data, the analytics server utilizes a dynamically generated session to aggregate analytics tracking data to account for late hits with new campaign information that could affect the data returned in the query. The process 700 then ends.

Although the example process 700 is described in connection with a single dynamically generated session, it should be understood that analytics tracking data can be aggregated for multiple dynamically generated sessions. In an example, in which a query requests a time period that includes more than one session, the analytics server can generate multiple sessions for aggregating the analytics tracking data.

In some configurations, the subject technology includes a system. The system includes memory, one or more processors, and one or more modules stored in memory and configured for execution by the one or more processors. In one example, the system includes an analytics data query module configured to receive a query for analytics tracking data associated with a period of time in which the analytics tracking data includes data for tracking activity associated with a web site or application, determine analytics tracking data for aggregating according to the period of time in order to associate the aggregated analytics tracking data with a dynamically generated session, and provide the aggregated analytics tracking data associated with the dynamically generated session in response to the query. The determined analytics tracking data is associated with one or more previously received analytics tracking data communications. The analytics tracking data includes campaign information associated with the previously received analytics tracking data communications in one example. The analytics tracking data includes web site or application traffic data included in a Hypertext Transfer Protocol (HTTP) request associated with the web site or application in one example. Each of the previously received analytics tracking data communications further includes a timestamp of an activity. The period of time includes a day (or a sub-period of time therein). The dynamically generated session is automatically generated in response to the query in one example.

In some configurations, the analytics data query module is further configured to aggregate the previously received analytics tracking data communications that fall within the period of time based on the timestamp of the activity of each of the previously received analytics tracking data communications. In one example, aggregating the previously received analytics tracking data communications is based on new campaign information received in a late hit.

V. Techniques for Delay Processing to Support Offline Hits

Figure 8:
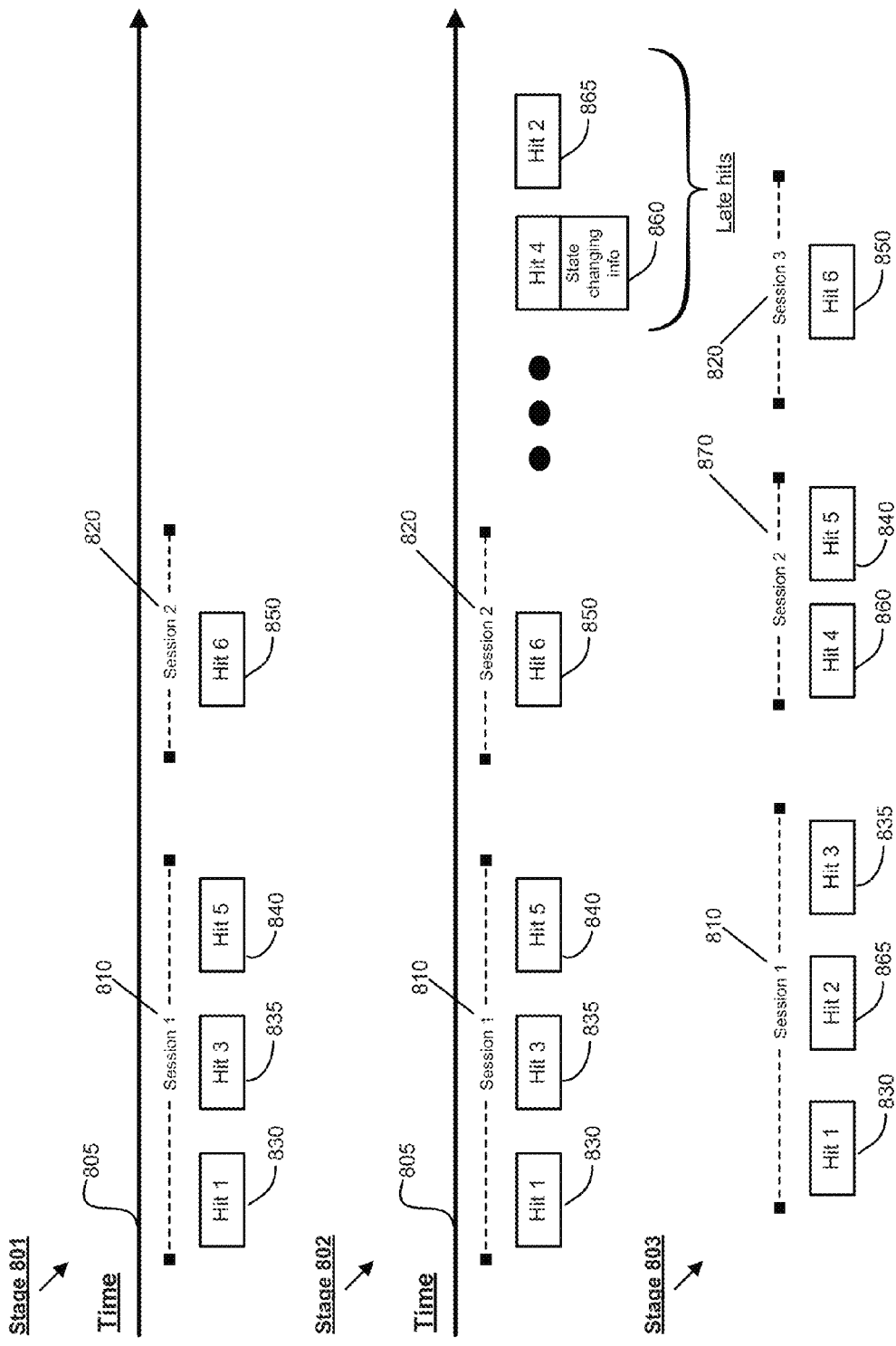
FIG. 8 conceptually illustrates an example time sequence in which different hits are received at an analytics server.

As described above, hits may be received late and/or out-of-order from an order in which corresponding visitor activity occurred at a publisher's web site or an application. The subject technology addresses late or out-of-order hits by performing dynamic sessionization of hits in which hits are split and/or merged from a previously associated session into a different session. FIG. 8 conceptually illustrates an example time sequence in which different hits are received at an analytics server. More specifically, the example in FIG. 8 shows different stages 801, 802 and 803 that different hits are received.

As illustrated in the stage 801, hits 830 ("Hit 1"), 835 ("Hit 3") and 840 ("Hit 5") are received in close temporal proximity to each other based on respective timestamps of each hit. Hit 850 ("Hit 6") is received at a later time. In one example, analytics tracking data including a timestamp is included in each hit. A hit's timestamp denotes a respective time in which visitor activity on a publisher's web site or an application was logged. For instance, the respective timestamps of hit 840 and hit 850 can indicate that the hits indicate respective activity that was logged more than a session timeout period apart (e.g., 30 minutes apart). As a result, the analytics server groups hits 830, 835 and 840 into a first session 810 and hit 850 into a second session 820.

In the stage 802, hits 860 ("Hit 4") and 865 ("Hit 2") are received later (e.g., past the expiration time of the first and second sessions). Similarly, hits 860 and 865 include analytics tracking data including respective timestamps in which visitor activity is logged. Further, hit 860 includes state changing information such as new campaign information. Based on the new campaign information included in hit 860, the analytics server determines that hit 860 should start a new session. Further, the analytics server determines that hit 865 should be included in the first session 810 based on the timestamp of hit 865.

In the stage 803, the analytics server utilizes the new campaign information in hit 860 to move hit 840 from the first session 810 to the newly created second session 870. In one example, the timestamp of hit 840 is closer in time to the timestamp of hit 860 (e.g., within a session timeout period). As a result, the analytics server makes a determination that hit 840 should be associated with the second session 870. In other words, the analytics server determines, by utilizing the new campaign information included in hit 860 and by comparing the respective timestamps of hits 840 and 860, that hit 840 should be included in the second session 870 with hit 860. Based on the respective timestamps of hit 840 and hit 850 (e.g., the respective timestamps are more than a session timeout period apart), the analytics server can determine that hit 850 should be included in a third session 820. In some configurations, a hit associated with a new campaign is included in a separate session from prior hits in a different session. In one example, the state changing information included in hit 860 is propagated to the hit 840 in the second session 870. In this manner, state changing information received from a late hit (e.g., hit 860) is propagated to subsequent hits in the same session (e.g., hit 840). In another example, the state changing information included in hit 860 is propagated to the hit 850 in the third session 820. In this manner, state changing information received from a late hit (e.g., hit 860) is propagated to subsequent hits in another session (e.g., hit 850).

Further shown in the stage 803, the analytics server includes the hit 865 in the first session 810. In one example, the respective timestamps of hit 865 is closer in time to the respective timestamps of hits 830 and 835. Consequently, the analytics server makes a determination that hit 865 should be included with hits 830 and 835 in the first session 810 based on the respective timestamps of hits 830, 835 and 865.

As illustrated, the first session 810 now includes hits 830, 865 and 835 and the second session 870 includes hits 860 and 840, and the third session 820 includes hit 850. In this manner, the analytics server can split and merge different hits into other sessions based on new campaign information, which enables the server to dynamically sessionize hits if hits are received late and/or out-of-order as shown in the example of FIG. 8.

Figure 9:
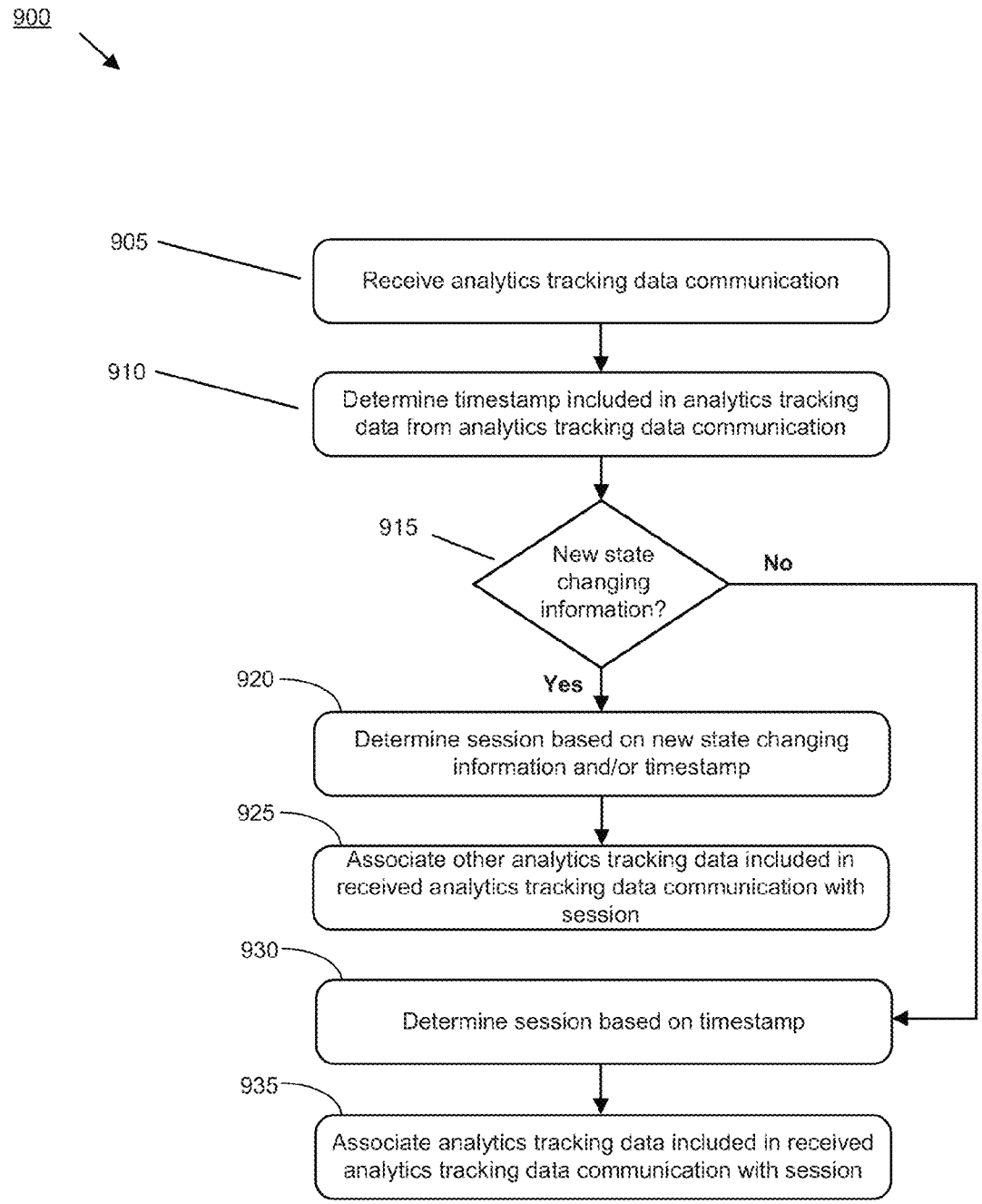
FIG. 9 conceptually illustrates an example process for processing late and/or out-of-order analytics tracking data communications.

The following example process describes how an analytics dynamically splits and merges an incoming analytics tracking data communication ("hit") with previously received analytics tracking data from prior hits. FIG. 9 conceptually illustrates an example process 900 for handling late and/or out-of-order analytics tracking data communications. As described before, analytics tracking data based on visitor activity ("web site tracking data") on a publisher's web site or an application can be included the aforementioned analytics tracking data communications (e.g., HTTP requests or "hits" that are generated from various user devices and/or clients) that are received and processed by the analytics server.

The process 900 begins at 905 by receiving an analytics tracking data communication. The process 900 at 910 determines a timestamp included in analytics tracking data from the received analytics tracking data communication. At 915, the process 900 determines if new state changing information is included in the analytics tracking data. In one example, new state changing information includes, but is not limited to, new campaign information. In another example, new state changing information includes, but is not limited to, gender information. If so, the process 900 continues to 920 to determine a session based on new state changing information and/or a timestamp. In one example, new state changing information includes new campaign information that creates a new session. In another example, new state changing information includes gender information where a new session will not be created by the new state changing information and the session will be determined by a timestamp. The process 900 continues to 925 to associate other analytics tracking data included in received analytics tracking data communication(s) with the session.

Alternatively if no new state changing information is received at 915, the process 900 continues to 930 to determine a session based on the timestamp included in the analytics tracking data. The process 900 at 935 then associates analytics tracking data included in the received analytics tracking data communication with the session. The process 900 then ends.

XX. Example System Architecture

The following section describes an example system that implements aspects of the above described invention.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 10:
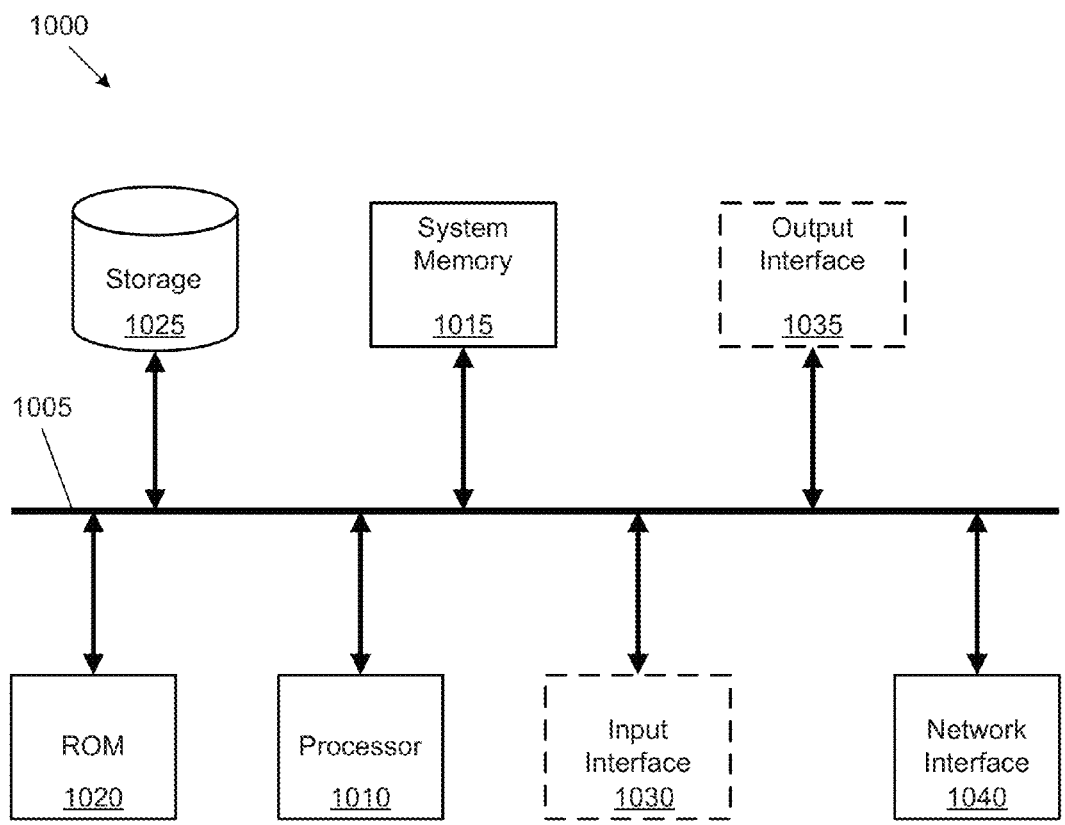
FIG. 10 conceptually illustrates an example system in which some configurations are implemented.

FIG. 10 conceptually illustrates a system 1000 with which some implementations of the subject technology may be implemented. The system 1000 can be a computer, phone, PDA, or any other sort of electronic device. Such a system includes various types of computer readable media and interfaces for various other types of computer readable media. The system 1000 includes a bus 1005, processing unit(s) 1010, a system memory 1015, a read-only memory 1020, a storage device 1025, an optional input interface 1030, an optional output interface 1035, and a network interface 1040.

The bus 1005 collectively represents all system, peripheral, and chipset buses that communicatively connect the numerous internal devices of the system 1000. For instance, the bus 1005 communicatively connects the processing unit(s) 1010 with the read-only memory 1020, the system memory 1015, and the storage device 1025.

From these various memory units, the processing unit(s) 1010 retrieves instructions to execute and data to process in order to execute the processes of the invention. The processing unit(s) can be a single processor or a multi-core processor in different implementations.

The read-only-memory (ROM) 1020 stores static data and instructions that are needed by the processing unit(s) 1010 and other modules of the system 1000. The storage device 1025, on the other hand, is a read-and-write memory device. This device is a non-volatile memory unit that stores instructions and data even when the system 1000 is off. Some implementations of the invention use a mass-storage device (such as a magnetic or optical disk and its corresponding disk drive) as the storage device 1025.

Other implementations use a removable storage device (such as a flash drive, a floppy disk, and its corresponding disk drive) as the storage device 1025. Like the storage device 1025, the system memory 1015 is a read-and-write memory device. However, unlike storage device 1025, the system memory 1015 is a volatile read-and-write memory, such a random access memory. The system memory 1015 stores some of the instructions and data that the processor needs at runtime. In some implementations, the invention's processes are stored in the system memory 1015, the storage device 1025, and/or the read-only memory 1020. For example, the various memory units include instructions for processing multimedia items in accordance with some implementations. From these various memory units, the processing unit(s) 1010 retrieves instructions to execute and data to process in order to execute the processes of some implementations.

The bus 1005 also connects to the optional input and output interfaces 1030 and 1035. The optional input interface 1030 enables the user to communicate information and select commands to the system. The optional input interface 1030 can interface with alphanumeric keyboards and pointing devices (also called "cursor control devices"). The optional output interface 1035 can provide display images generated by the system 1000. The optional output interface 1035 can interface with printers and display devices, such as cathode ray tubes (CRT) or liquid crystal displays (LCD). Some implementations can interface with devices such as a touchscreen that functions as both input and output devices.

Finally, as shown in FIG. 10, bus 1005 also couples system 1000 to a network interface 1040 through a network adapter (not shown). In this manner, the computer can be a part of a network of computers (such as a local area network ("LAN"), a wide area network ("WAN"), or an Intranet, or an interconnected network of networks, such as the Internet. Any or all components of system 1000 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

What is claimed is:

1. A machine-implemented method for providing aggregated analytics tracking data associated with a dynamically generated session in response to a query for analytics tracking data, the method comprising:

receiving, by one or more processors, a plurality of communication including analytics tracking data corresponding to activity on one or more resources of a content publisher, each of the communication including a timestamp at which the activities occurred;

storing at least part of the analytics tracking data in non-persistent storage to allow for later-received analytics tracking data to be combined the tracking data stored in the non-persistent storage;

moving the analytics tracking data from the non-persistent storage to a persistent storage after a predetermined timeframe;

receiving, by the one or more processors, a query for analytics tracking data corresponding to activity on the one or more resources of the content publisher, the query identifying a period of time within which the activity occurred and a client for which aggregate analytics tracking data is requested;

dynamically generating, by the one or more processors, in response to the query, a temporary tracking session record specific to the query;

aggregating, by the one or more processors, based on timestamps of the received communications, the analytics tracking data previously received by the one or more processors that falls within the period of time included in the query and is associated with the client for which the aggregate tracking data is requested, aggregating the analytic tracking date comprising including analytics data temporarily stored in the non-persistent storage in the aggregated analytics tracking data when the analytics data stored in the non-persistent storage includes timestamps falling within the time period included in the query and associated with the client identified in the query;

associating, by the one or more processors, the aggregated analytics tracking data with the dynamically generated tracking session record; and providing the aggregated analytics tracking data associated with the dynamically generated session record in response to the query.

2. The method of claim 1, wherein the aggregated analytics tracking data is associated with one or more previously received communications including analytics tracking data for tracking activity associated with one or more resources of the content publisher.

3. The method of claim 2, wherein the analytics tracking data includes campaign information associated with the previously received communications.

4. The method of claim 2, wherein the analytics tracking data includes web site or application traffic data included in a Hypertext Transfer Protocol (HTTP) request associated with the one or more resources.

5. The method of claim 1, wherein aggregating the previously received analytics tracking data includes aggregating analytics tracking data committed to persistent storage.

6. The method of claim 1, wherein the period of time comprises a day.

7. The method of claim 1, wherein the dynamically generated tracking session is automatically generated in response to the query.

8. The method of claim 7, wherein the dynamically generated session record comprises a temporary session record that is utilized for responding to the query.

9. A system, the system comprising:
  memory;
  one or more processors configured to execute instructions stored in memory, the one or more processor configured to
  receive a plurality of communications including analytics tracking data corresponding to activity on one or more resources of a content publisher, each of the communications including a timestamp at which the activities occurred;

store at least part of the analytics tracking data in non-persistent storage to allow for later-received analytics tracking data to be combined the tracking data stored in the non-persistent storage;

move the analytics tracking data from the non-persistent storage to a persistent storage after a predetermined timeframe receive a query for analytics tracking data corresponding to activity on the one or more resources of the content publisher, the query identifying a period of time within which the activity occurred and a client for which aggregate analytics tracking data is requested;

dynamically generate, in response to the query, a temporary tracking session record specific to the query;

aggregate, based on timestamps of the received communications, the analytics tracking data previously received by the one or more processors that falls within the period of time included in the query and is associated with the client for which the aggretate tracking data is requested, aggregate the analytics tracking data comprising including analytics data temporarily stored in the non-persistent storage in the aggregated analytics tracking data when the analytics data stored in the non-persistent storage includes timestamps falling within the time period included in the query and associated with the client identified in the query;

associate the aggregated analytics tracking data with the dynamically generated tracking session record; and provide the aggregated analytics data associated with the dynamically generated session record in response to the query.

10. The system of claim 9, wherein the aggregated analytics tracking data is associated with one or more previously received communications including analytics tracking data for tracking activity associated with one or more resources of the content publisher.

11. The system of claim 10, wherein the analytics tracking data includes campaign information associated with the previously received communications.

12. The system of claim 10, wherein the analytics tracking data includes web site or application traffic data included in a Hypertext Transfer Protocol (HTTP) request associated with the one or more resources.

13. The system of claim 10, wherein to aggregate the previously received analytics tracking data, the processor is configured to aggretate analytics tracking data committed to persistent storage.

14. The system of claim 9, wherein the period of time comprises a day.

15. The system of claim 9, wherein the dynamically generated tracking session record is automatically generated in response to the query.

16. A non-transitory machine-readable medium comprising instructions stored therein, which when executed by a machine, cause the machine to perform operations comprising:

receiving a plurality of communications including analytics tracking data corresponding to activity on one or more resources of a content publisher, each of the communications including a timestamp at which the activities occurred;

storing at least part of the analytics tracking data in non-persistent storage to allow for later-received analytics tracking data to be combined the tracking data stored in the non-persistent storage;

moving the analytics tracking data from the non-persistent storage to a persistent storage after a predetermined timeframe;

receiving a query for analytics tracking data corresponding to activity on the one or more resources of the content publisher, the query identifying a period of time within which the activity occurred and a client for which aggregate analytics tracking data is requested;

dynamically generating, in response to the query, a temporary tracking session record specific to the query;

aggregating, based on timestamps of the received communications, the analytics tracking data previously received by an analytics server that falls within the period of time included in the query and is associated with the client for which the aggregated tracking data is requested, aggregating the analytics tracking data comprising generating the aggregated analytics tracking data based at least in part on first analytics tracking data temporarily stored in non-persistent storage, the first analytics tracking data stored in persistent storage after a predetermined timeframe, the first analytics tracking data temporarily stored in the non-persistent storage to allow for later-received analytics tracking data to be combined with the first analytics tracking data before committing the first analytics tracking data to persistent storage;

associating the aggregated analytics tracking data with the dynamically generated tracking session record; and providing the aggregated analytics tracking data associated with the dynamically generated session in response to the query.

* * * * *